Figures 1, 2:
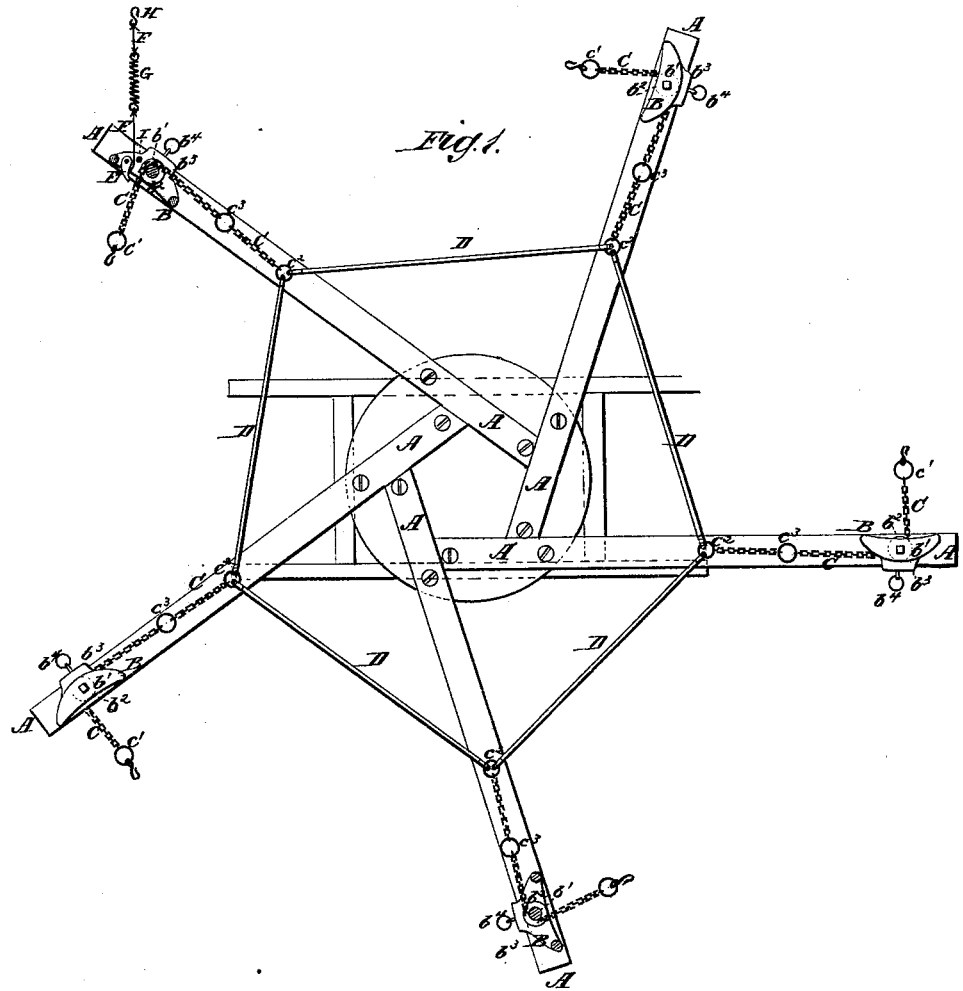

J. R. DICKINSON.
DRAFT-EQUALIZING DEVICE FOR HORSE-POWERS.

No. 195,264. Patented Sept. 18, 1877.

WITNESSES:

INVENTOR:
J. R. Dickinson
BY
ATTORNEYS.

UNITED STATES PATENT OFFICE.

JOHN R. DICKINSON, OF IDA, MICHIGAN.

IMPROVEMENT IN DRAFT-EQUALIZING DEVICES FOR HORSE-POWERS.

Specification forming part of Letters Patent No. 195,264, dated September 18, 1877; application filed June 25, 1877.

*To all whom it may concern:*

Be it known that I, JOHN R. DICKINSON, of Ida, in the county of Monroe and State of Michigan, have invented a new and useful Improvement in Draft-Equalizing Device for Horse-Powers, of which the following is a specification:

Figure 1 is a top view of my improved draft-equalizer shown as applied to the sweeps of a horse-power, and partly in section, to show the construction. Fig. 2 is a side view of the same, partly in section, to show the construction.

Similar letters of reference indicate corresponding parts.

The object of this invention is to furnish a draft attachment for horse-powers which shall be so constructed as to compel all the teams to draw equally, which may be so adjusted as to prevent a weak horse or team from being drawn too far back, and which shall be simple in construction, easily applied, and reliable in use.

The invention will first be described in connection with the drawing, and then pointed out in the claim.

A represents the sweeps of a horse-power, to the outer ends of which the draft is applied. Upon the upper sides of the outer ends of the sweeps A are attached cast-iron boxes B, which are secured to the sweeps A by bolts $b^1$, which pass through the boxes B, through the pulleys $b^2$ interposed between the top and bottom of said boxes, and through the sweeps A. Upon the rear part of the boxes B are formed flanges $b^3$, through which and the sweeps A are passed bolts $b^4$. The bolts $b^4$ prevent the sweeps A from splitting, and to their heads are attached rings for the leading-rein of the following team to be attached to.

C are the draw-chains, which are passed through the boxes B and around pulleys $b^2$. The draw-chains C have rings $c^1$ attached to their forward ends, to which are attached hooks for the draft to be applied to, and which prevent the draw-hooks from being drawn back into and getting caught in the boxes B.

To the inner ends of the chains C are attached rings $c^2$, into which the ends of the connecting-rods D are hooked, so that each team may be drawn against the others, and all may be made to draw alike.

In the chains C, about four feet from their outer ends, and about one foot from their inner ends, are attached rings $c^3$, to prevent the ends of the connecting-rods D from being drawn to, and getting caught upon, the boxes B.

In case a weak horse or team be used, a pawl, E, is pivoted in the outer part of the box B, to which is attached a short chain, F, a part of which is formed by a spiral spring, G, and which has a hook, H, attached to its outer end, to be hooked into the main draft-chain C, so that if the weak horse or team is drawn back by the said chain the pawl E may be drawn against the chain C to clamp it, and prevent the said weak horse or team from having to draw against the others.

The spring G is designed to prevent the chain F from being broken should the pawl E slip upon the chain C. The chain F passes round a pin, I, attached to the box B, and which is provided with a ferrule or tubular washer, to prevent wear. The chain F can be readily detached or allowed to hang, and the pawl E turned back or detached when not required for use.

Having thus described my invention, I claim as new and desire to secure by Letters Patent—

The combination of the pawl E, the chain F, the spring G, the hook H, and the pin and washer I with the box B and the draw-chain C, substantially as herein shown and described.

JOHN R. DICKINSON.

Witnesses:
   B. F. SOUTHWICK,
   JOHN MARTIN.